United States Patent [19]

Denham et al.

[11] 4,402,919

[45] Sep. 6, 1983

[54] PROCESS FOR THE REGENERATION OF MINERAL ACIDS USED TO SOLUBILIZE PHOSPHATE ORES

[75] Inventors: Dale Denham, Boulder; Roland Schmidt, Wheat Ridge, both of Colo.

[73] Assignee: Kerr-McGee Corporation, Oklahoma City, Okla.

[21] Appl. No.: 245,386

[22] Filed: Mar. 19, 1981

[51] Int. Cl.$^3$ .................. C01G 43/00; C01B 25/16; C01B 17/72; B01D 11/00

[52] U.S. Cl. ........................................... 423/8; 423/10; 423/18; 423/319; 423/320; 423/522; 423/132

[58] Field of Search ............... 423/6, 8, 9, 10, 321 R, 423/320, 132, 522, 319, 18

[56] References Cited

U.S. PATENT DOCUMENTS 2,905,526 9/1959 McCullough .................... 423/10

FOREIGN PATENT DOCUMENTS 10267 of 1884 United Kingdom ............... 423/132

Primary Examiner—O. R. Vertiz
Assistant Examiner—Gregory A. Heller
Attorney, Agent, or Firm—William G. Addison

[57] ABSTRACT

A process for solubilizing uranium and other values in an ore containing the same together with aluminum and phosphorus and effecting regeneration of a mineral acid employed to solubilize the ore. The regeneration is effected by heating the spent acid solution resulting from solubilization of the ore in a reaction zone to a temperature above 100° C. while maintaining at least the autogenic pressure of the heated solution within the reaction zone. The treatment causes aluminum phosphate to precipitate from the solution while simultaneously causing regeneration of at least a portion of the mineral acid in the solution that was consumed to originally solubilize the ore. The dissolved uranium and other elements of value can be recovered from the solution, either before or after acid regeneration, by any known technique. The regenerated mineral acid then can be used to solubilize fresh ore.

18 Claims, No Drawings

PROCESS FOR THE REGENERATION OF MINERAL ACIDS USED TO SOLUBILIZE PHOSPHATE ORES

BACKGROUND OF THE INVENTION

1. Field of the Invention

This invention relates to a process for the regeneration of mineral acids used to solubilize phosphate ores which thereby permits recovery of uranium and other valuable minerals from the ore.

2. Description of the Prior Art

It is well known in the phospheric acid technology that phosphate ore can be treated with a mineral acid to convert the phosphate into a soluble form, either as phosphate fertilizers, phosphoric acid or phosphoric acid compositions which can be processed into phosphate chemicals. The solubilization process also is known to dissolve impurities in the ore such as uranium and vanadium which then can be separately recovered from the resultant solution. One of the largest economic expenses of the process is the cost of the mineral acid that is consumed during the solubilization. The quantity of mineral acid required to effect the solubilization is directly related to the quantity of acid soluble materials present in the ore. Most of the acid soluble materials are dissolved in the process of solubilizing the phosphate values. No simple method is known in the prior art to regenerate the acid used to convert the phosphates into a soluble form.

Large phosphate ore fields are known to exist in Florida and in other areas of the United States. For economic reasons, only the phosphate ores containing a high ratio of phosphate to other acid soluble materials are considered commercially recoverable. The high quality commercially recoverable ores of the Florida fields have been found to contain limited quantities of uranium. The overburden on the high quality phosphate ore comprises material referred to as "leached zone material" which consists largely of sand containing components of aluminum, phosphorus, iron and other values together with clays. The leached zone material has been formed by natural weathering or leaching of the phosphate ore field. The low phosphate content of this leached ore presently makes its utilization unattractive for the production of phosphates because of the large quantity of mineral acid required to solubilize the ore. However, this leached ore has been found to contain uranium in concentrations significantly greater than in the higher quality phosphate ore that is considered commercially recoverable.

The major problem preventing the recovery of the uranium in the Florida leached zone material and from other phosphate ore fields is one of economics. A large quantity of acid is required to effect dissolution of the uranium present in these ores. The high acid requirement is due to the fact that the aluminum, phosphorus and other acid soluble values also must be dissolved to solubilize the uranium. Further, no effective method of physically concentrating the minerals to produce a significantly higher quality concentrate for treatment has been found.

Presently, the best known concentrating procedure produces a concentrate of the uranium and other phosphate minerals by scrubbing and sizing the raw ore to obtain a select fraction which then is dissolved with a mineral acid. This procedure rejects from about 60 to about 75 percent of the ore, by weight, as a coarse fraction of large particles size quartz sand and upgrades the uranium, aluminum and phosphorus content of the remainder. Acid consumption still is substantially higher than desirable. For example, 1600 to 2000 pounds of 93 to 98 percent sulfuric acid are required to dissolve 2000 pounds of concentrate. It is known that calcining the concentrate before dissolution will reduce acid consumption. However, acid consumption remains at about 600 pounds of 93 to 98 percent sulfuric acid per 2000 pounds of original concentrate.

It is desirable to provide a process that will permit regeneration of a portion of the acid that is consumed to solubilize the ore in which the uranium is present.

SUMMARY OF THE INVENTION

The surprising discovery now has been made that uranium can be dissolved from an ore comprising aluminum, phosphorus, uranium and other values by a procedure which reduces the quantity of acid consumed to effect the dissolution by over one half the quantity presently consumed in the best prior art process. The reduction in acid consumption is effected by regeneration of a substantial portion of the acid consumed to solubilize the ore.

In practice, the ore is contacted with a mineral acid to solubilize at least a portion of the acid soluble constituents including any uranium contained in the ore. The ore can be physically concentrated or otherwise treated such as by calcination prior to contacting the mineral acid. The solubilization results in the formation of a spent acid solution containing dissolved uranium, aluminum, phosphorus and other values together with any undissolved solids. The spent acid solution then is heated to a predetermined elevated temperature while maintaining at least the autogenic pressure of the solution to effect a precipitation of aluminum phosphate from the solution. The precipitation results in the regeneration of a substantial portion of the mineral acid consumed to solubilize the ore. The uranium values then can be recovered from the remaining solution by any known techniques. The uranium depleted solution comprising regenerated acid then is recycled to contact fresh ore to solubilize additional uranium values.

Alternatively, the uranium can be recovered from the spent acid solution prior to acid regeneration.

An additional benefit of the process is the production of a high quality aluminum phosphate by-product.

DESCRIPTION OF THE PREFERRED EMBODIMENT

A feed material comprising an ore containing aluminum, phosphorus and other values including uranium is treated to obtain a select fraction having a particle size less than about 150 U.S. Standard mesh and preferably less than 200 U.S. Standard mesh to provide a concentrate fraction. The concentrate fraction contains valuable quantities of uranium and other elements such as aluminum and phosphorus. The remainder of the feed material predominately comprises quartz and is discarded. The treatment by which the concentrate fraction is obtained can include crushing, scrubbing, grinding or milling of the ore to provide a particulate capable of being sized. The particulate is sized by screening or any other suitable means. The particular apparatus employed can comprise any commercially available equipment capable of producing the concentrate fraction.

The concentrate fraction then is admixed with a sufficient quantity of a leach solution comprising a mineral acid to effect solubilization of a substantial portion of the concentrate fraction and at least a portion of the uranium present in said concentrate fraction. The mineral acid can comprise, for example, sulfuric acid, phosphoric acid and the like. In a typical reaction, a 150 mesh size fraction in aqueous slurry form, having a solids content in the range of from about 30 percent to about 60 percent, is reacted with the sulfuric acid at temperatures in a range between about ambient temperature to above the boiling temperature of the leach solution and preferably from about 60° C. to about 90° C. For temperatures above the boiling temperature of the leach solution, the solubilization is effected under a pressure at least equal to the autogenic pressure of the heated solution.

Preferably, the solubilization is carried out for a period of time ranging between 0.2 and about 15 hours and more particularly, for a period of from about 30 minutes to about 60 minutes, although the length of time may be varied considerably depending upon other variables in the reaction conditions. The interdependence of variables makes for vast differences in the specific conditions employed as to each variation. In general, it may be stated the higher the percent acid acidulation used, the shorter the time required. Thus, for example, if about 70 percent acidulation is used, that is, about 106.5 pounds of 96 percent sulfuric acid per 100 pounds of ore, only about 15 minutes is required to acomplish the digestion, while at about 45 percent acidulation, about 6 hours digestion is necessary to give good recovery of the desired constituents. Depending upon the analysis of the particular ore processed, between about 30 percent and 105 percent acidulation is desired. This corresponds to the addition of between about 29 pounds and about 150 pounds of sulfuric acid per hundred pounds of ore processed. Preferably, about 70 percent acidulation is used. The percent acidulation referred to in this description is calculated on the basis of the reaction of sulfuric acid with all of the aluminum, calcium and iron, or other significant cationic constituents present in the ore. In other words, 100 percent acidulation would be the addition of that amount of sulfuric acid required to completely react with these components. After the solubilization, the aqueous solution of reaction products, sometimes referred to as "spent acid solution," is separated from the insolubles, such as quartz and clay.

The substantially solids-free aqueous solution of reaction products is introduced into a reaction zone wherein the solution is heated to a temperature above 100° C. while maintaining the solution at a pressure level at least equal to the autogenic pressure of the solution to effect a precipitation of the leached phosphorus values as crystalline aluminum phosphate. Preferably, the aqueous solution is heated to a temperature level in the range of from about 150° C. to about 200° C. and most preferably a temperature in the range of from about 180° C. to about 200° C. Temperatures above 200° C. can be employed to effect the precipitation of the leached phosphorus values, however, the precipitation reaction is essentially complete at about 200° C.

The present inventors have found that when the leached phosphorus values are precipitated within the aqueous solution, in the described manner, that a portion of the mineral acid is regenerated. This is evidenced by a significant drop in the pH level of the aqueous solution of reaction products as the aluminum phosphate precipitate is formed. The aqueous slurry produced at a result of the precipitation of the $AlPO_4$ also contains other values, including uranium, that were dissolved during solubilization of the ore. These additional elements remain in the solution and generally do not precipitate with the aluminum phosphate.

While the precise mechanism of the chemical reaction involved in regeneration of the mineral acid presently in unknown, the inventors presently believe that the major portion of the aluminum and phosphorus contained in the aqueous solution of reaction products, resulting from solubilization of the ore, is in the form of $AlH_2PO_4^{+2}$. It is believed that the mineral acid is regenerated according to the following equation:

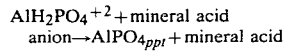

More particularly, when sulfuric acid is employed to solubilize the ore, the acid is believed to be regenerated according to the following equation:

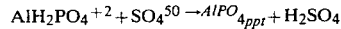

An analysis of the precipitate employing x-ray diffraction indicates that the precipitate comprises berlinite, an anhydrous aluminum phosphate. Further, chemical analysis of the precipitate indicates that it contains no detectable quantity of uranium and no significant quantity of any of the other solubilized mineral values present in the aqueous solution of reaction products, the precipitate being found to have a purity in excess of 99 percent aluminum phosphate. Thus, the process of this invention also produces a high quality by-product that has a significantly higher $P_2O_5$ content than, for example, apatite, which is considered a high quality source of phosphorus.

The precipitated aluminum phosphate can be separated from the aqueous slurry of the same by filtration, centrifugation gravity settling or the like. The particular apparatus employed to effect the separation can comprise any of that which commercially is available.

In one particular embodiment in which the mineral acid comprises sulfuric acid, if an attempt is made to precipitate the aluminum and phosphorus from the aqueous solution of reaction products at a temperature below about 100° C., a precipitate will form. However, the precipitate is alunogen ($Al_2(SO_4)_3.18H_2O$) and no mineral acid is regenerated. When sulfuric acid comprises the mineral acid, it also has been observed that any calcium sulfate which may tend to precipitate from the aqueous solution of reaction products after formation of such solution should be permitted to form. The precipitated calcium sulfate then should be separated from the aqueous solution before introduction of the now substantially solids-free aqueous solution into the reaction zone to precipitate the aluminum phosphate. Otherwise, a mixed calcium aluminum sulfate is found to precipitate instead of aluminum phosphate and no sulfuric acid is regenerated.

The presence of calcium in the aqueous solution when mineral acids other than aulfuric acid are employed to effect the solubilization of the ore has no apparent effect upon the precipitation of the aluminum and phosphorus values as aluminum phosphate. The filtrate remaining after separation of the aluminum phosphate, which contains dissolved uranium and other elements, can be treated by any known method to recover the uranium and any other desired elements.

The uranium can be separated from the filtrate by, for example, solvent extraction techniques whereby the uranium values are transferred from the aqueous filtrate to an organic solvent extractant. The extracted uranium then is separated from the organic solvent by, for example, contact with an alkaline stripping agent. Various processes for solvent extraction of tranium and other values from aqueous acidic solutions are disclosed in, for example, U.S. Pat. Nos. 3,700,415, 3,711,591 and 3,836,476, the disclosures of which are incorporated herein by reference. It is to be understood that the method for separating the uranium or any other values from the aqueous solution is not to be limited to solvent extraction processes but that any method known by individuals skilled in the art may be employed.

The practice of the process of the present invention results in the regeneration of over 50 percent of the acid employed to solubilize the ore. Often, the present process effects regeneration of over two thirds of the mineral acid originally employed to solubilize the ore. Such regeneration capability permits applicants to recover uranium present in low phosphate content ores in an economical manner while also providing a high purity by-product of aluminum phosphate which can be used as a feed stock for production of aluminum and phosphorus chemicals.

To further illustrate the process of the present invention, and not by way of limitation, the following examples are provided.

EXAMPLE I

A representative sample of an aqueous solution of reaction products resulting from sulfuric acid leaching of a minus 150 mesh fraction of Florida leached zone material is introduced into a reaction zone comprising a Parr autoclave having an acid resistant liner. The solution is formed by contacting 1600 lbs. of 96 percent $H_2SO_4$ with one ton of uncalcined leached zone material. The aqueous solution is analyzed and is found to contain 55.3 g/l $Al_2O_3$, 30 g/l $P_2O_5$, 0.11 g/l $U_3O_8$ and have a pH of about 0.5. The aqueous solution is heated in the reaction zone to a temperature of about 200° C. while maintaining the autogenic pressure of the aqueous solution. The solution is maintained at the elevated temperature for about 5 minutes to effect precipitation of crystalline aluminum phosphate in the solution to form a slurry. The slurry is withdrawn from the reaction zone and filtered to separate the precipitate from the aqueous solution. The precipitate is assayed and is found to comprise in excess of 99 percent aluminum phosphate and less than 0.001 percent $U_3O_8$. The pH level of the filtrate is measured and is found to be about 0.2. The filtrate is analyzed and is found to contain 23 g/l $Al_2O_3$ and 3.7 g/l $P_2O_5$.

The formation of the aluminum phosphate precipitate is found to regenerate an amount of mineral acid equivalent to in excess of 800 lbs. of 96 percent sulfuric acid per ton of original leached zone material. This represents in excess of about 50 percent of the acid necessary to solubilize a similar quantity of the leached zone material.

EXAMPLE II

A representative sample of an aqueous solution of reaction products resulting from sulfuric acid leaching of a minus 150 mesh fraction of calcined leached zone material is introduced into a reaction zone comprising a modified Parr autoclave. The solution is formed by contacting 600 lbs. of 96 percent $H_2SO_4$ with one ton of leached zone material that is calcined prior to contact with the acid. The aqueous solution is analyzed and is found to contain 100 g/l $Al_2O_3$, 120 g/l $P_2O_5$, 0.3 g/l $U_3O_8$ and have a pH of about 1.3. The aqueous solution is heated in the reaction zone to a temperature of about 200° C. while maintaining the autogenic pressure of the aqueous solution. The solution is maintained at the elevated temperature for about 5 minutes to effect precipitation of crystalline aluminum phosphate in the solution to form a slurry. The slurry is withdrawn from the reaction zone and filtered to separate the precipitate from the aqueous solution. The precipitate is assayed and is found to comprise in excess of 99 percent aluminum phosphate and less than 0.001 percent $U_3O_8$. The pH level of the filtrate is measured and is found to be about 0.5. The filtrate is analyzed and is found to contain 39.5 g/l $Al_2O_3$ and 36.4 g/l $P_2O_5$.

The formation of the aluminum phosphate precipitate is found to regenerate an amount of mineral acid equivalent to in excess of 420 lbs. of 96 percent sulfuric acid per ton of original leached zone material. This represents in excess of about 70 percent of the acid necessary to solubilize a similar quantity of the leached zone material.

While the present invention has been described with respect to what at present are the preferred embodiments thereof, it will be understood, of course, that certain changes, substitutions, modifications and the like can be made therein without departing from its true scope as defined in the appended claims.

What is claimed is:

1. A process for the regeneration of mineral acid used to solubilize phosphate ore comprising:

contacting an ore comprising aluminum, phosphorus and other values including uranium with a leach solution comprising a mineral acid selected from the group consisting of phosphoric acid and sulfuric acid to solubilize at least a portion thereof and form a solution of spent mineral acid and solubilized values in association with any non-solubilized values, said solubilized values including aluminum, phosphorus and uranium;

introducing said solution of spent mineral acid and solubilized values into a reaction zone; and heating said solution to said reaction zone to a temperature in excess of 100° C. while maintaining the pressure level at least equal to the autogenic pressure of said solution to cause a substantially uranium-free precipitate of crystalline aluminum phosphate to form and to regenerate at least a portion of said spent mineral acid to form regenerated leach solution containing solubilized uranium values.

2. The process of claim 1 defined further to include the steps of:

contacting said regenerated leach solution with an organic extractant to extract at least a portion of any solubilized uranium values present therein; and recovering said extracted uranium values from said organic extractant.

3. The process of claim 1 defined further to include the steps of:

contacting said solution of spent mineral acid and solubilized values, prior to heating said solution, with an organic extractant to extract at least a portion of any solubilized uranium values present in said solution; and recovering said uranium values from said organic extractant.

4. The process of claim 1 wherein the ore comprises leached zone material.

5. The process of claim 1 wherein the temperature to which the solution is heated in the reaction zone is in the range of from about 100° C. to about 200° C.

6. The process of claim 1 wherein the temperature to which the solution is heated in the reaction zone is in the range of from about 150° C. to about 200° C.

7. The process of claim 1 wherein the temperature to which the solution is heated in the reaction zone is in the range of from about 180° C. to about 200° C.

8. A process for the regeneration of mineral acid used to solubilize phosphate ore comprising:

separating an ore comprising aluminum, phosphorus, uranium and other elements into at least two fractions, at least one of said fractions having an average ore particle of a size capable of passing through a U.S. Standard 150 mesh screen;

contacting said fraction capable of passage through a U.S. Standard 150 mesh screen with an aqueous leach solution comprising a mineral acid selected from the group consisting of phosphoric acid and sulfuric acid to solubilize at least a portion thereof and form an aqueous solution of reaction products comprising spent mineral acid and solubilized values, said solubilized values including aluminum, phosphorus and uranium;

separating said aqueous solution of reaction products from any unsolubilized ore to provide a substantially solids-free solution of reaction products;

introducing said substantially solids-free solution of reaction products into a reaction zone; and heating said solution in said reaction zone to a temperature in the range of from about 100° C. to about 200° C. while maintaining the pressure level at least equal to the autogenic pressure of said solution to cause a precipitate of substantially uranium-free crystalline aluminum phosphate to form and to cause at least a portion of said spent mineral acid to regenerate and form regenerated aqueous leach solution containing solubilized uranium values.

9. The process of claim 8 wherein the temperature to which the solution is heated in the reaction zone is in the range of from about 150° C. to about 200° C.

10. The process of claim 8 wherein the temperature to which the solution is heated in the reaction zone is in the range of from about 180° C. to about 200° C.

11. The process of claim 8 wherein at least 50 percent of the mineral acid employed to solubilize the ore is regenerated.

12. The process of claim 8 wherein at least 70 percent of the mineral acid employed to solubilize the ore is regenerated.

13. The process of claim 8 defined further to include the steps of:

contacting said aqueous solution of reaction products, prior to heating in said reaction zone, with an organic extractant to extract at least a portion of any solubilized uranium values present in said aqueous solution; and recovering said uranium values from said organic extractant.

14. The process of claim 8 defined further to include the steps of:

contacting said regenerated aqueous leach solution with an organic extractant to extract at least a portion of any solubilized uranium values present therein; and recovering said extracted uranium values from said organic extractant.

15. The process of claim 2 defined further to include the step of:

contacting fresh ore with the uranium-depleted regenerated leach solution to solubilize at least a portion of said fresh ore.

16. The process of claim 3 defined further to include the step of:

contacting fresh ore with the regenerated leach solution to solubilize at least a portion of said fresh ore.

17. The process of claim 13 defined further to include the step of:

contacting fresh ore with the regenerated leach solution to solubilize at least a portion of said fresh ore.

18. The process of claim 14 defined further to include the step of:

contacting fresh ore with the uranium-depleted regenerated leach solution to solubilize at least a portion of said fresh ore.

* * * * *